(12) United States Patent
Faucher et al.

(10) Patent No.: US 12,292,410 B2
(45) Date of Patent: May 6, 2025

(54) APPARATUS FOR COUPLANT MANAGEMENT

(71) Applicant: Evident Canada, Inc., Québec (CA)

(72) Inventors: Denis Faucher, Lévis (CA); Alain Deschênes, Montmagny (CA)

(73) Assignee: Evident Canada, Inc., Québec (CA)

( * ) Notice: Subject to any disclaimer, the term of this patent is extended or adjusted under 35 U.S.C. 154(b) by 224 days.

(21) Appl. No.: 17/916,334

(22) PCT Filed: Mar. 30, 2021

(86) PCT No.: PCT/CA2021/050416
§ 371 (c)(1),
(2) Date: Sep. 30, 2022

(87) PCT Pub. No.: WO2021/195756
PCT Pub. Date: Oct. 7, 2021

(65) Prior Publication Data
US 2023/0142564 A1     May 11, 2023

Related U.S. Application Data

(60) Provisional application No. 63/003,379, filed on Apr. 1, 2020.

(51) Int. Cl.
*G01N 29/22* (2006.01)
*G01N 29/11* (2006.01)
(Continued)

(52) U.S. Cl.
CPC ........... *G01N 29/225* (2013.01); *G01N 29/28* (2013.01); *G01N 29/11* (2013.01); *G01N 29/265* (2013.01);
(Continued)

(58) Field of Classification Search
CPC ...... G01N 29/225; G01N 29/28; G01N 29/11; G01N 29/265; G01N 2291/044; G01N 2291/106
(Continued)

(56) References Cited

U.S. PATENT DOCUMENTS 5,469,744 A * 11/1995 Patton .................. G10K 11/004
                                               73/644
6,092,420 A     7/2000 Kimura et al.
(Continued)

FOREIGN PATENT DOCUMENTS

CN         101301209 A * 11/2008
CN         100581481 C * 1/2010
(Continued)

OTHER PUBLICATIONS

Drinkwater et al., An Ultrasonic Wheel Probe Al Terna Tive to Liquid Coupling, Review of Progress in Quantitative Nondestructive Evaluation, vol. 14, 1995, pp. 7 (Year: 1995).*
(Continued)

*Primary Examiner* — Stephanie E Bloss
*Assistant Examiner* — Kevin C Butler
(74) *Attorney, Agent, or Firm* — Schwegman Lundberg & Woessner, P.A.

(57) ABSTRACT

A couplant feeding circuit is provided. The couplant feeding circuit has a first set of walls extending from a bottom surface and a second set of walls extending from the bottom surface and between the first set of walls. A membrane extends between the first and second set of walls such that the first and second set of walls along with the membrane form a couplant cavity. The couplant feeding circuit also has a couplant port disposed in one of the first or second set of walls that allows routing of couplant to the couplant cavity. Moreover, the couplant feeding circuit also has a vacuum (Continued)

port disposed in one of the first or second set of walls that allows removal of at least a portion of the couplant from the couplant cavity. Furthermore, the couplant port and the vacuum port form a closed loop within the couplant feeding circuit.

20 Claims, 15 Drawing Sheets

(51) Int. Cl.
    *G01N 29/265*     (2006.01)
    *G01N 29/28*     (2006.01)

(52) U.S. Cl.
    CPC . *G01N 2291/044* (2013.01); *G01N 2291/106* (2013.01)

(58) Field of Classification Search
    USPC .......................................................... 73/618
    See application file for complete search history.

(56) References Cited

U.S. PATENT DOCUMENTS

| | | | | |
|---|---|---|---|---|
| 6,298,727 | B1* | 10/2001 | Fleming | G01N 29/22 73/644 |
| 6,481,290 | B1* | 11/2002 | MacInnis | G01N 29/11 73/644 |
| 7,284,434 | B1* | 10/2007 | Fleming | G01N 29/07 73/644 |
| 8,087,298 | B1* | 1/2012 | DiMambro | G01N 29/262 73/644 |
| 8,353,619 | B2 | 1/2013 | Laugharn, Jr. et al. | |
| 8,371,173 | B1* | 2/2013 | DiMambro | G01N 29/265 73/644 |
| 2019/0388998 | A1* | 12/2019 | Huggett | G01N 29/262 |
| 2021/0356439 | A1* | 11/2021 | Kwon | G01N 29/223 |
| 2023/0142564 | A1* | 5/2023 | Faucher | G01N 29/225 73/618 |
| 2023/0393101 | A1* | 12/2023 | Briggs, IV | G01N 29/265 |

FOREIGN PATENT DOCUMENTS

| | | |
|---|---|---|
| CN | CN-100581481 C | 1/2010 |
| CN | 115516305 | 12/2022 |
| WO | WO-2017165010 A2 * | 9/2017 ........... B23K 20/123 |
| WO | WO-2020072712 A1 | 4/2020 |
| WO | WO-2021195756 A1 | 10/2021 |

OTHER PUBLICATIONS

Kwak et al., Detection of Small-Flaw in Carbon Brake Disc (C-C) Using Air-Coupled Ultrasonic C-Scan Technique, International Journal of Precision Engineering and Manufacturing vol. 18, No. 7, Jul. 2017, pp. 987-994 ( Year: 2017).*
Cawley et al., Further Development of a Conformable Phased Array Device for Inspection Over Irregular Surfaces, AIP Conf. Proc. 975, 754-761 (2008) https://doi.org/10.1063/1.2902738 (Year: 2008).*
Yang et al., Highly sensitive PZT transducer with integrated miniature amplifier for photoacoustic imaging, 2019 IEEE International Ultrasonics Symposium (IUS) Glasgow, Scotland, Oct. 6-9, 2019 (Year: 2019).*
Le Jeune et al., Multimodal plane wave imaging for non-destructive testing, 2015 International Congress on Ultrasonics, 2015 ICU Metz, Physics Procedia 70 ( 2015) 570-573 (Year: 2015).*
Murashov et al., Nondestructive Testing of Glued Joints, Klei. Germetiki. Tekhnologii, 2008, No. 7, pp. 21-28 (Year: 2008).*
Gaal et al., Ultrasonic Testing of Adhesively Bonded Joints Using Air-Coupled Cellular Polypropylene Transducers, 11th European Conference on Non-Destructive Testing (ECNDT 2014), Oct. 6-10, 2014, Prague, Czech Republic (Year: 2014).*
"International Application Serial No. PCT/CA2021/050416, International Search Report mailed Jun. 11, 2021", 4 pgs.
"International Application Serial No. PCT/CA2021/050416, Written Opinion mailed Jun. 11, 2021", 6 pgs.
Hossein, Taheri, et al., "Fast Ultrasonic Imaging with Total Focusing Method (TFM) for Inspection of Additively Manufactured Polymer Composite Component", osti.gov. 27th ANST Research Symposium, [Online]. Retrieved from the Internet: <URL:https://www.osti.gov/biblio/1502599>, (2018), 3 pgs.
"European Application Serial No. 21780147.1, Extended European Search Report mailed Jan. 22, 2024", 8 pgs.
"Canadian Application Serial No. 3,178,144, Office Action mailed Feb. 29, 2024", 4 pgs.
"Canadian Application Serial No. 3,178,144, Response filed Jul. 2, 2024 to Office Action mailed Feb. 29, 2024", 16 pgs.
"European Application Serial No. 21780147.1, Response filed Aug. 7, 2024 to Extended European Search Report mailed Jan. 22, 2024", w/ claims, 13 pgs.

* cited by examiner

APPARATUS FOR COUPLANT MANAGEMENT

CLAIM FOR PRIORITY

The present application is a U.S. National Stage Application under 35 U.S.C. 371 from International Application No. PCT/CA2021/050416, entitled "APPARATUS FOR COUPLANT MANAGEMENT", and published as WO 2021/195756 on Oct. 7, 2021, which claims priority to U.S. Provisional Application Ser. No. 63/003,379 entitled "Apparatus For Couplant Management", the contents of which are incorporated herein in their entirety.

TECHNICAL FIELD

This document pertains generally, but not by way of limitation, to Nondestructive Testing (NDT) of structural components and systems. In particular, implementations of the present disclosure provide a compact apparatus that manages couplant used therein during NDT of structural components and systems.

BACKGROUND

NDT can be used to locate and characterize material features on or within an article. Such features can indicate a presence of flaws such as cracks or voids, or material characteristics such as porous regions or interfaces between differing materials. For example, NDT can be used in the aerospace field to perform non-destructive inspection of components such as airfoils or turbine components, as illustrative examples. Generally, NDT is performed in a manner that does not damage the article during or after testing. Examples of NDT can include ultrasonic scanning where a couplant facilitates coupling of acoustic energy from a transducer array to an article under test. For example, water or a gel can be used as a couplant where the couplant serves an acoustic matching medium between the article and the transducer array, avoiding unwanted scattering or reflection that might occur if dissimilar materials (e.g., air) were present between the transducer array and the article. When water is used as the couplant during testing, an immersion bath can be used or, in instances where an immersion bath is not viable, a device can be used that dispenses the water over the article being tested and an area surrounding the article. Such an approach can be wasteful if the water merely drains away from the inspection interface. In instances where an immersion bath is not viable, air bubbles may be present within or near an inspection interface between a probe and the article under test during NDT.

SUMMARY

What is needed is an apparatus that suppresses or inhibits air bubbles from an inspection area of an article during NDT of the article. The apparatus can economize expenditure of couplant, such as using a recirculation approach, and may be adaptable for surfaces having various contours.

Examples of the present disclosure can provide a couplant feeding circuit plate that can be used with a device that inspects an article using NDT. Couplant is routed to an area of the article being inspected and, at least in part, removed from the area being inspected via the couplant feeding circuit plate. In an implementation, the couplant feeding circuit plate can include a housing the extends circumferentially around a couplant cavity. In an implementation, the couplant cavity defined by the wall and a membrane. Moreover, in an implementation, the couplant feeding circuit plate can include a couplant port and a vacuum port. The couplant port can route couplant to the couplant cavity while the vacuum port can route at least a portion of the couplant from the couplant cavity.

In an implementation, the couplant feeding circuit plate can include a first set of walls extending from a bottom surface of the couplant feeding circuit plate and a second set of walls extending from the bottom surface of the couplant feeding circuit plate and between the first set of walls. Moreover, the couplant feeding circuit plate can include a membrane that extends between the first set of walls and the second set of walls where the first set of walls, the second set of walls, and the membrane form a couplant cavity. In an implementation, the couplant feeding circuit plate can include a couplant port and a vacuum port disposed in one of the first set of walls and the second set of walls. In an implementation, the couplant port allows pushing of a couplant to the couplant cavity while the vacuum port allows removal of at least a portion of the couplant from the couplant cavity. In an implementation, in addition to pulling the couplant, the vacuum port can pull air bubbles that may be present in the couplant cavity.

In an implementation, the couplant feeding circuit plate can be configured to couple with different wedges of different NDT apparatuses at a top surface of the couplant feeding circuit plate opposite the bottom surface. Moreover, in an implementation, the couplant feeding circuit plate can include a first side and a second side opposite the first side, where the couplant port and the vacuum port can be in one of the first set of walls or the second set of walls disposed at the first side. In an implementation, only one of the first set of walls or the second set of walls can include couplant and vacuum ports. In this implementation, this configuration can capture or suppress any air bubbles that may rise within a couplant cavity of the couplant feeding circuit due to a buoyant force.

In an implementation, when the couplant feeding circuit plate having the couplant port and the vacuum port disposed on the first side couples with a wedge, the first side of the couplant feeding circuit plate is a first distance from a top surface of the wedge and the second side is a second distance from the top surface of the wedge. In an implementation, the first distance can be less than the second distance such that first side of the couplant feeding circuit plate is closer to the wedge top surface than the second side of the couplant feeding circuit plate. In this implementation, this configuration can capture or suppress any air bubbles that may rise within a couplant cavity of the couplant feeding circuit due to a buoyant force when the couplant feeding circuit plate is inclined.

In another implementation, the couplant feeding circuit plate can include couplant ports on a first side of the plate and a second side of the plate. Moreover, in another implementation, the couplant feeding circuit plate can include vacuum ports on the first side of the couplant feeding circuit plate and the second side of the couplant feeding circuit plate.

DETAILED DESCRIPTION

Examples of the present disclosure provide a couplant feeding circuit plate that can be used with a device that inspects an article using NDT. Couplant is pushed to an area of the article being inspected and pulled from the area being inspected in a closed loop via the couplant feeding circuit plate. In an implementation, the couplant feeding circuit plate can include a housing defined by a first set of walls extending from a bottom surface of the couplant feeding circuit plate and a second set of walls extending from the bottom surface of the couplant feeding circuit plate and between the first set of walls. Moreover, the couplant feeding circuit plate can include a membrane that extends between the first set of walls and the second set of walls where the first set of walls, the second set of walls, and the membrane form a couplant cavity that can be placed in proximity with an article to be inspected. In an implementation, the couplant feeding circuit plate can include a couplant port and a vacuum port disposed in one of the first set of walls and the second set of walls. In an implementation, the couplant port allows pushing of a couplant to the couplant cavity while the vacuum port allows removal of couplant from the couplant cavity. In an implementation, in addition to pulling the couplant, the vacuum port can pull air bubbles that may be present in the couplant cavity.

Figure 1:
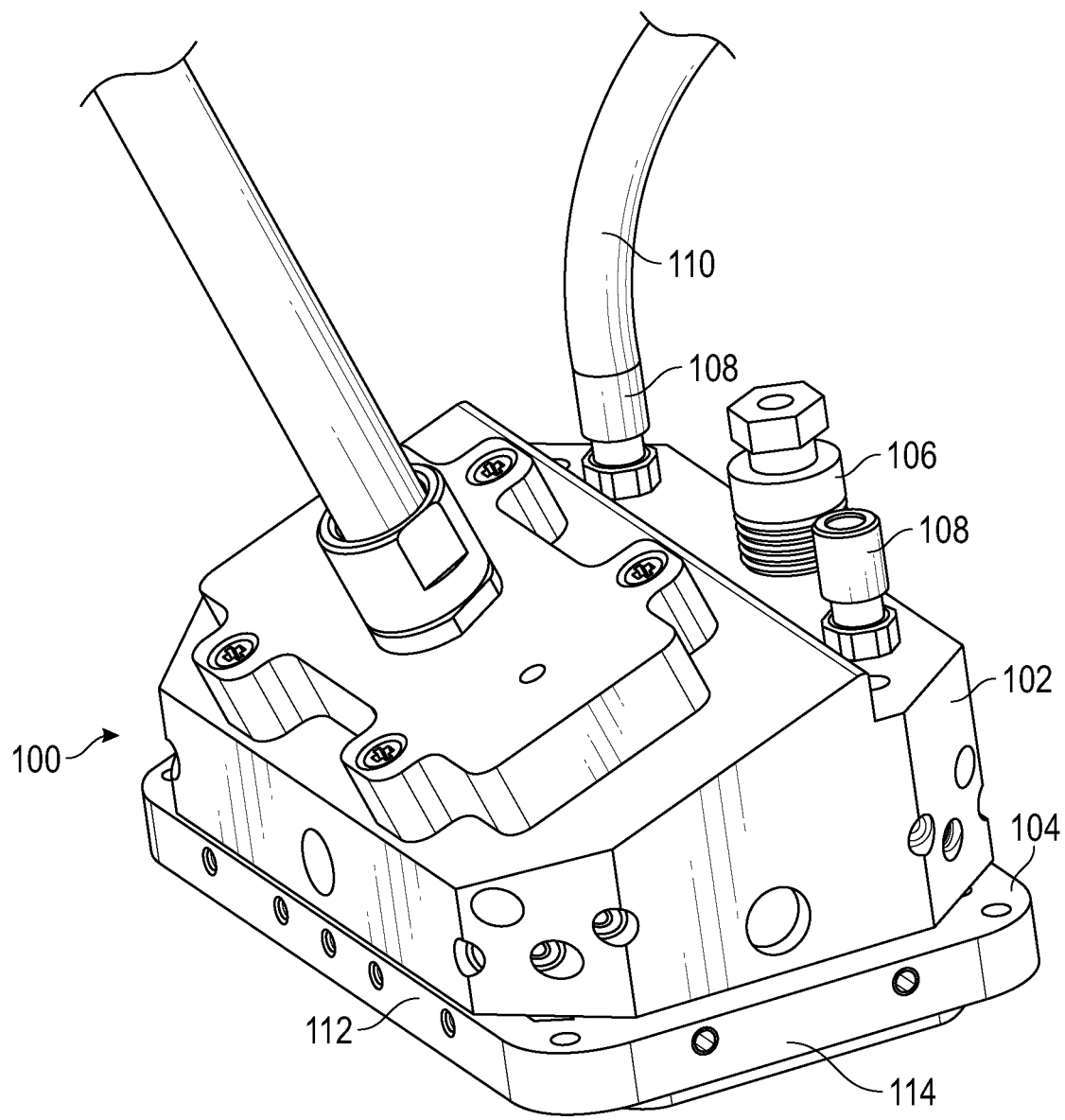
FIG. 1 illustrates a NDT apparatus, in accordance with examples of the present disclosure.

Now making reference to the Figures, and more specifically FIG. 1, a NDT apparatus 100 is shown in accordance with an implementation. The NDT apparatus 100 can include a couplant feeding circuit plate (CFCP) 104 along with a wedge 102. In some implementations, as will be discussed below, the wedge 102 can be configured to allow couplant to be pushed to the CFCP 104. Moreover, as will be discussed further below, the wedge 102 can be configured to allow couplant to be pulled from the CFCP 104. The NDT apparatus can also include a couplant inlet 106 and vacuum inlets 108 that couple with vacuum hoses 110 (only one is shown in FIG. 1).

Figure 2A:
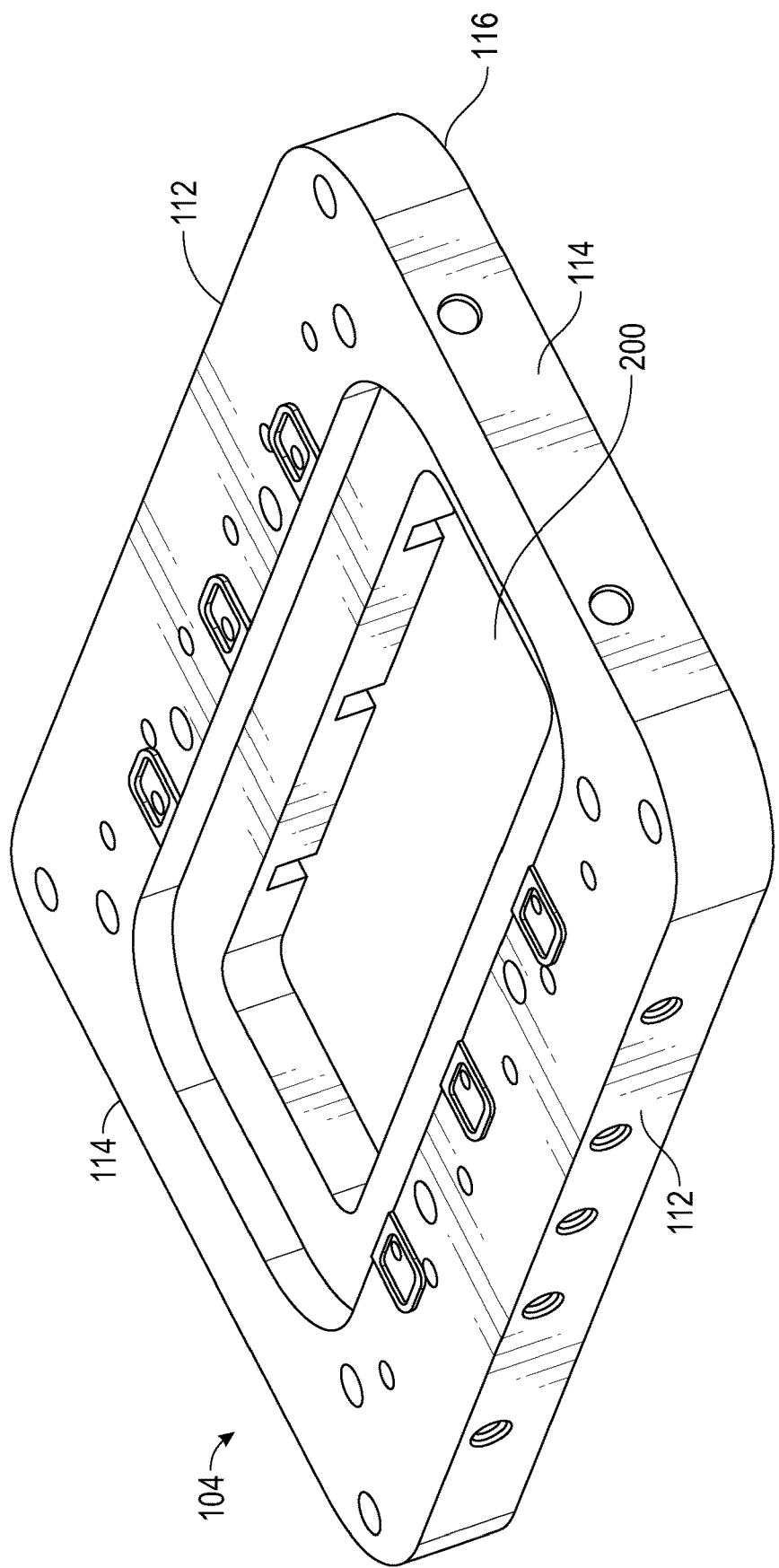
FIG. 2A illustrates a couplant feeding circuit plate of the NDT apparatus shown with reference to FIG. 1, in accordance with examples of the present disclosure.

In an implementation, the CFCP 104 can include a first set of sidewalls 112 and a second set of sidewalls 114. Throughout this document, reference may be made to the first set of sidewalls 112 and the sidewall 112. It should be noted that reference to the first set of sidewalls 112 and the sidewall 112 can be used interchangeably. Similarly, throughout this document, reference may be made to the second set of sidewalls 114 and the sidewall 114. It should be noted that reference to the second set of sidewalls 114 and the sidewall 114 can be used interchangeably. In an implementation, the first set of sidewalls 112 and the second set of sidewalls 114 can form a housing 116 that extends circumferentially around a couplant cavity 200, as shown with reference to FIGS. 2A-2C. In an implementation, the housing 116 can include a wall, such as the sidewall 112, the sidewall 114, or both the sidewall 112 and the sidewall 114. Throughout this document, reference will be made to elements being disposed within the sidewall 112 and the sidewall 114. It should be noted that when an element is described as being disposed within the sidewall 112 and/or the sidewall 114, this also can refer to the element being disposed in a wall of the housing 116. As may be seen with reference to FIG. 2A, the second set of sidewalls 114 can extend between the first set of sidewalls 112 such that the couplant cavity 200 can be defined by the sidewalls 112 and 114 (FIG. 2B).

Figure 2B:
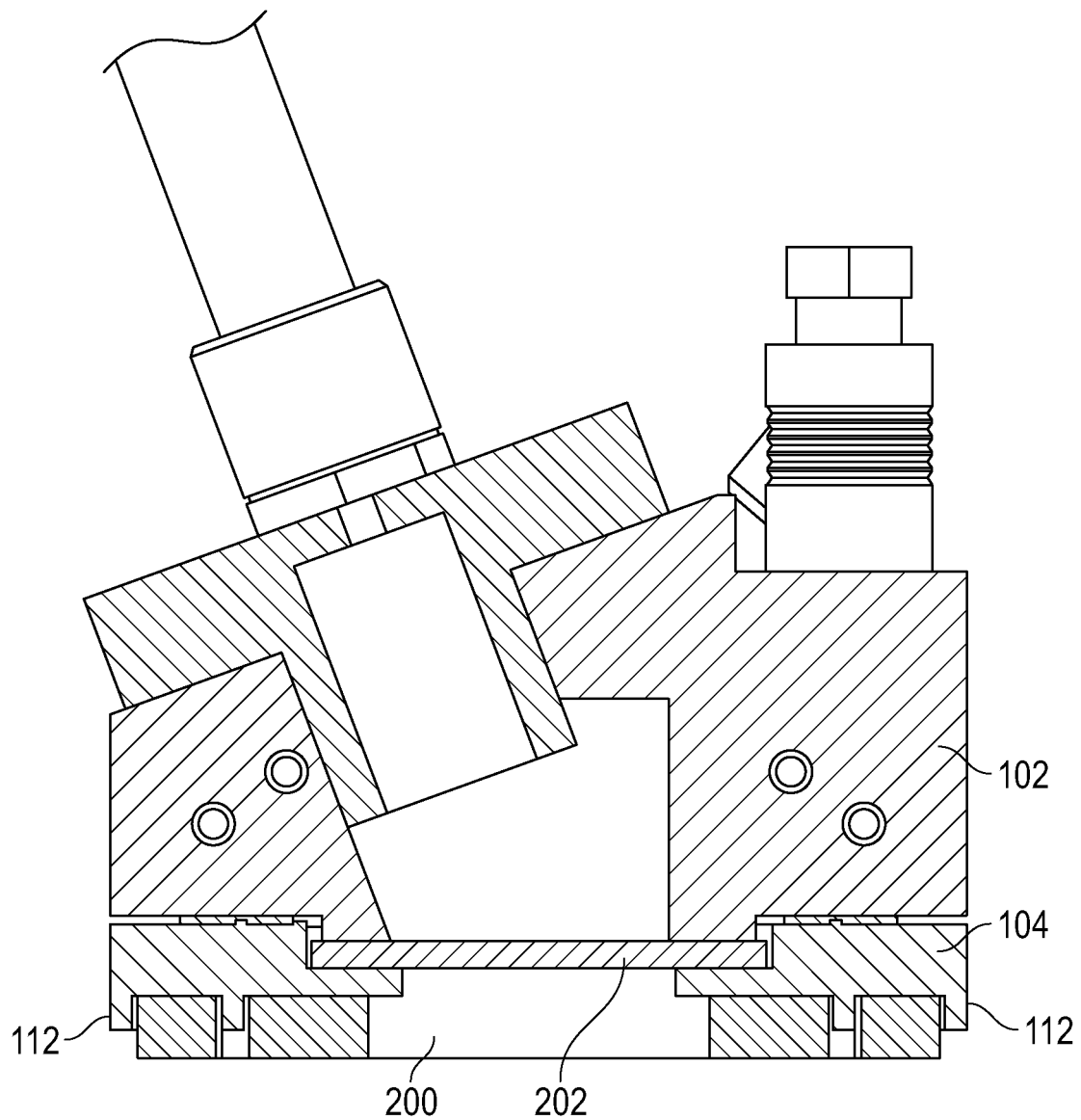
FIG. 2B is a side view of the NDT apparatus shown with reference to FIG. 1, in accordance with examples of the present disclosure.
Figure 2C:
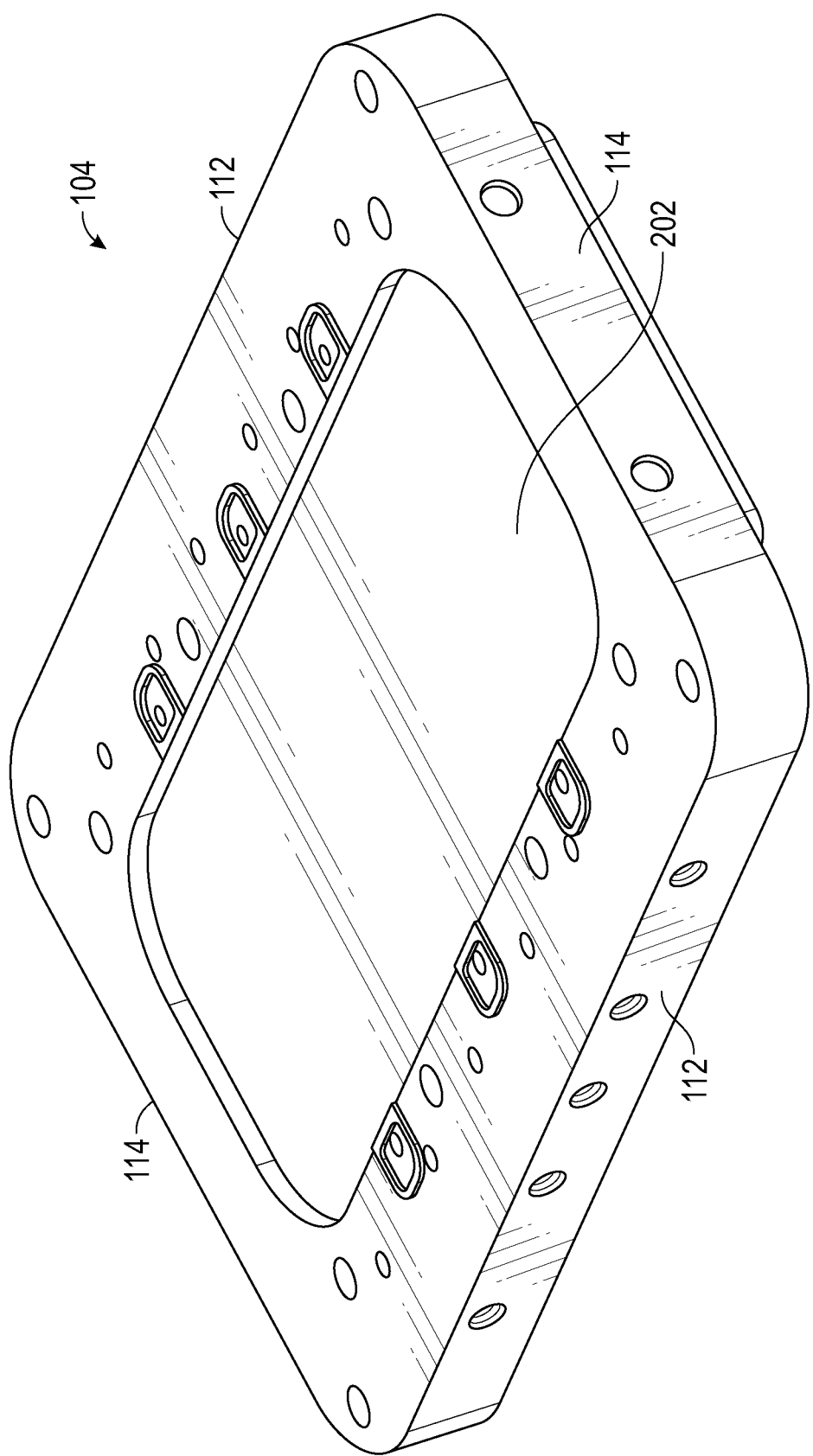
FIG. 2C illustrates a couplant feeding circuit plate of the NDT apparatus shown with reference to FIG. 1, in accordance with examples of the present disclosure.

Moreover, as may be seen with regards to FIGS. 2B and 2C, the couplant cavity 200 can also be enclosed by a membrane 202 that extends between the sidewalls 112 and 114. As such, the couplant cavity 200 can be formed by the sidewalls 112 and 114 and the membrane 202. The membrane 202 can be formed from any elastomer suitable for ultrasonic inspection. In particular, the couplant pushed into the couplant cavity 200 can have a first acoustic impedance. In an implementation, the membrane 202 can have a second acoustic impedance similar to the first acoustic impedance of the couplant. In implementations where the couplant is water, the membrane 202 can be Aqualene™.

Figure 3:
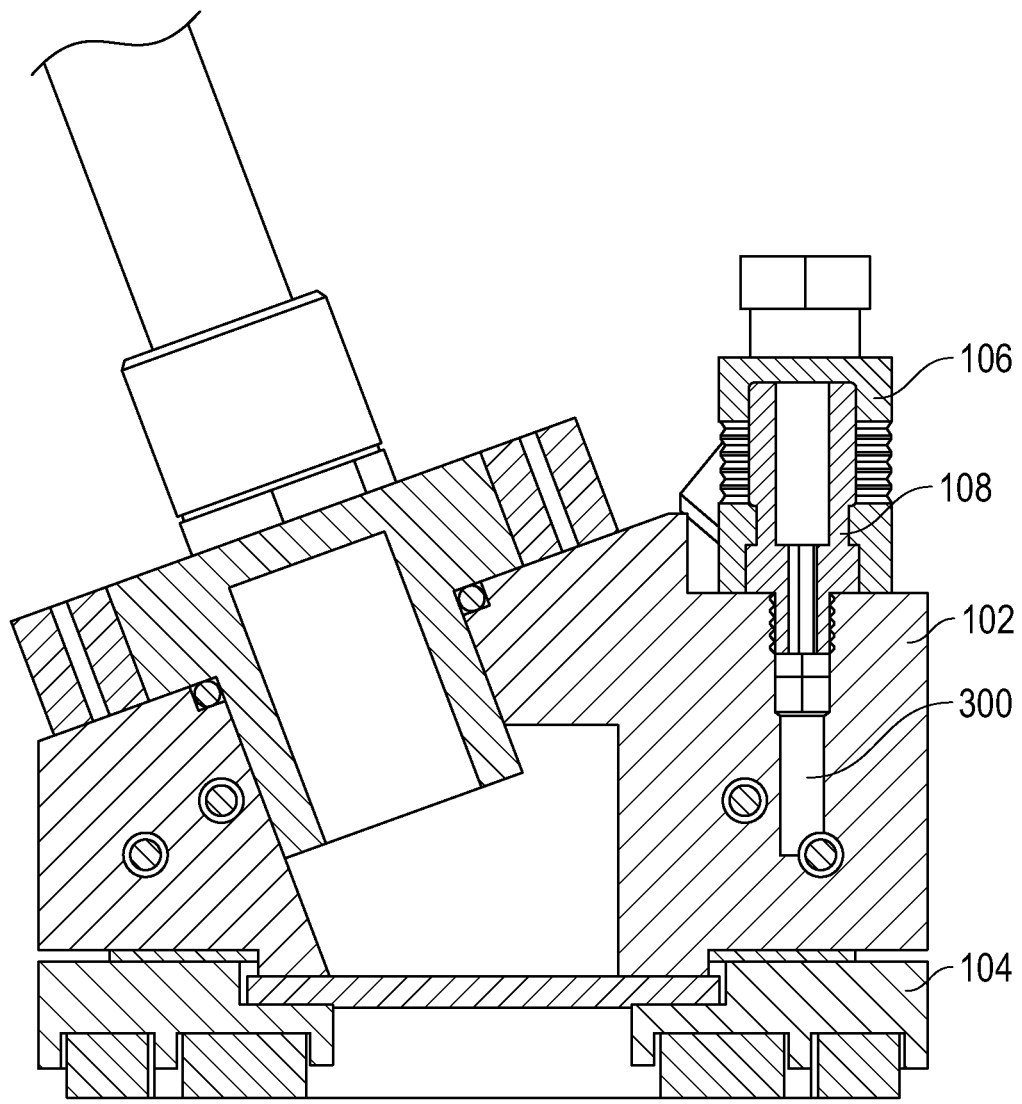
FIGS. 3 and 4 are side views of the NDT apparatus shown with reference to FIG. 1, in accordance with examples of the present disclosure.

As noted above, the NDT apparatus 100 can include the vacuum inlet 108 that can couple to the wedge 102. In an implementation, a partial vacuum source (not shown) can pull couplant from the wedge 102 and the CFCP 104 via the vacuum inlet 108. Thus, the vacuum inlet 108 allows for the removal of couplant from the couplant cavity 200. The vacuum inlet 108 can be any type of coupling that facilitates the coupling of the vacuum hose 110 to the wedge 102, such as a Milton style coupler, a quick connect hose coupling, or the like. Moreover, the vacuum inlet 108 can be in fluid communication with a vacuum port 300 disposed within the wedge 102, as shown with reference to FIG. 3. In an embodiment, the vacuum inlet 108 can be coupled to a vacuum source (not shown) via the vacuum hose 110. As will be discussed in further detail below, the vacuum source operates to pull couplant pushed to the CFCP 104 via the couplant inlet 106 during operation of the NDT apparatus 100. More specifically, the vacuum source pulls the couplant via the vacuum inlet 108 and the vacuum port and 300.

Figure 4:
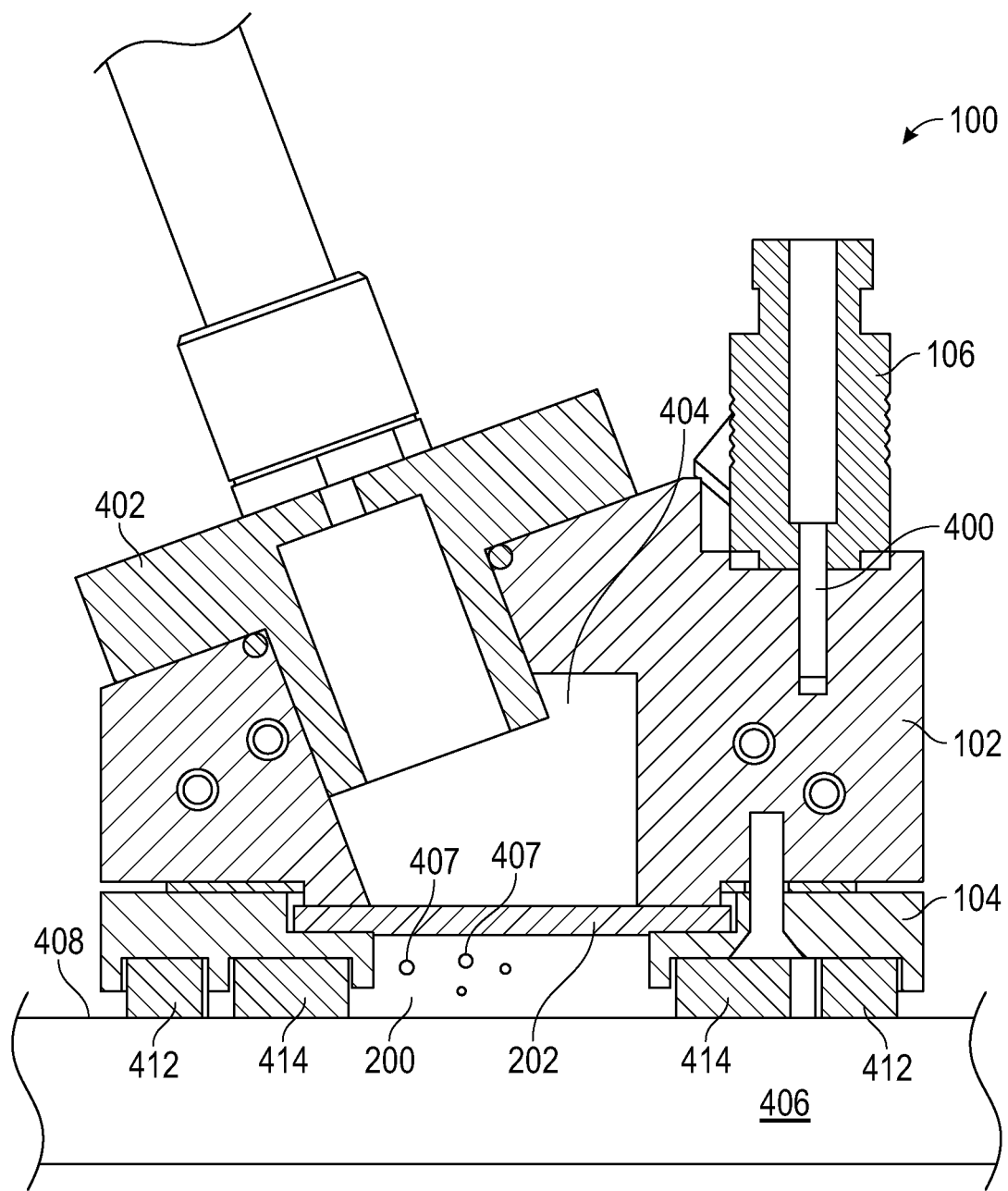

As previously mentioned, the NDT apparatus 100 can include the couplant inlet 106 that can couple to the wedge 102. In an implementation, a couplant source (not shown) can push couplant into the wedge 102 and the CFCP 104 via the couplant inlet 106. The couplant inlet 106 can be any type of coupling that facilitates the coupling of a couplant source to the wedge 102, such as a female/male coupler, a quick connect hose coupling, or the like. In an implementation, the wedge 102 can include a couplant port 400 that is in fluid communication with the couplant inlet 106, as shown with reference to FIG. 4. In an implementation, the couplant inlet 106 receives a couplant from a couplant source (not shown) and facilitates passage of the couplant to the wedge couplant port 400. The wedge couplant port 400 passes the couplant through the wedge 102 and to the CFCP 104. In an implementation, examples of couplant can include water, gel, or oil.

In an implementation, the NDT apparatus 100 can include a probe 402 disposed within a couplant chamber 404 defined within the wedge 102. In an embodiment, the probe 402 can include any type of ultrasonic transducer. For example, the probe 402 can include either a single element immersion transducer having a wavelength layer or an array of single element immersion transducers having a wavelength later acoustically matched with a couplant disposed within the couplant chamber 404, such as water. Such transducers are available from Olympus Corporation of the Americas headquartered in Center Valley, PA.

During operation of the NDT apparatus 100, couplant is pushed into the couplant cavity 200 while the NDT apparatus 100 inspects an article 406. However, air bubbles 407 may form within the couplant cavity 200 during inspection of the article 406. The air bubbles 407 may become trapped within the couplant cavity 200 when the NDT apparatus 100 is first placed on a surface 408 of the article 406. Furthermore, the article surface 408 may be uneven such that when the NDT apparatus 100 passes over the uneven portion of the article surface 408, the air bubbles 407 may become trapped within the couplant cavity 200.

During ultrasonic testing, sound waves traveling through a couplant reflect in predictable ways off of flaws such as cracks and voids that can be present in the article 406 or the article surface 408. In particular, sound waves from the probe 402 couple to the article 406 via couplant in the couplant cavity 200, the membrane 202, and the couplant chamber 404. Sound waves travel through the couplant in each of the chambers 200 and 404 and through the membrane 202. The sound waves are reflected from the article 406 and are processed to create a waveform display that can be used to identify defects in the article 406. The probe 402 generates and processes ultrasonic signals that can be used to create a waveform display that can be used to identify hidden defects in the article 406. A characteristic reflection pattern can be identified from an article that does not have defects, and then this may be used to identify changes in the reflection pattern that may indicate defects. However, if the air bubbles 407 are present within the couplant cavity 200, the air bubbles 407 can create reflectional attenuations, which can cause inaccurate readings of the article 406 and the creation of an inaccurate waveform display and hence the misidentification of potential defects in the article 406.

Figure 5:
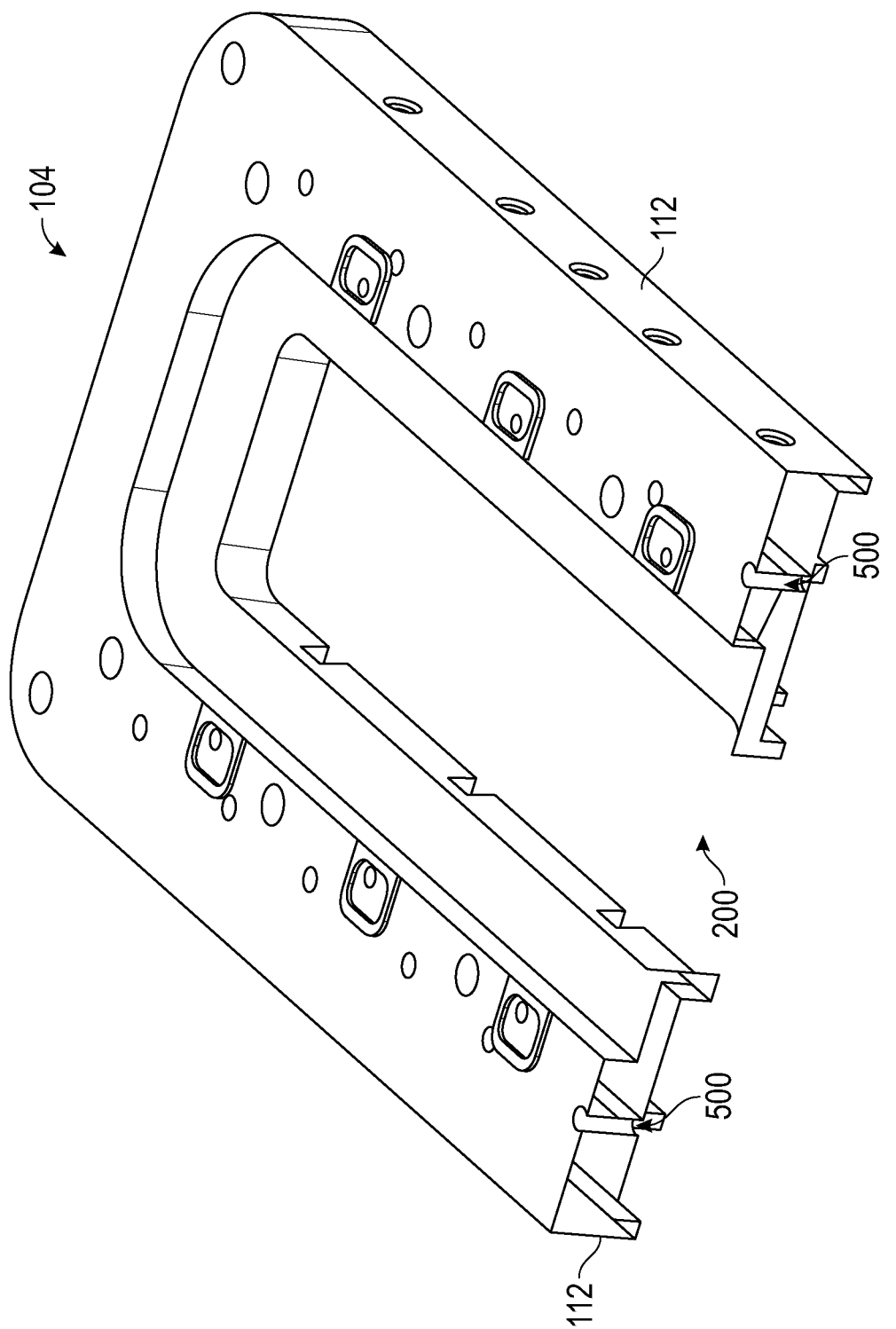
FIG. 5 is a cut-away view of the couplant feeding plate shown with reference to FIGS. 2A and 2C, in accordance with examples of the present disclosure.

In an implementation, the CFCP 104 is configured to remove air bubbles from the couplant cavity 200 during operation of the NDT apparatus 100. Making reference to FIGS. 5 and 6A, the CFCP 104 can include vacuum ports 500 along with vacuum ports 600. The CFCP vacuum ports 500 can be in fluid communication with the wedge vacuum ports 300 of the wedge 102. As may be seen with reference to FIG. 6A, the CFCP vacuum ports 600 can extend between the couplant cavity 200 and the CFCP vacuum ports 500. In an implementation, the CFCP vacuum ports 600 can be recessed within a surface 700 of the CFCP 104, as shown with reference to FIG. 7. Thus, in an embodiment, the CFCP vacuum ports 600 can form a passageway within the CFCP 104 that can extend between the couplant cavity 200 and the CFCP vacuum ports 500.

Figure 6A:
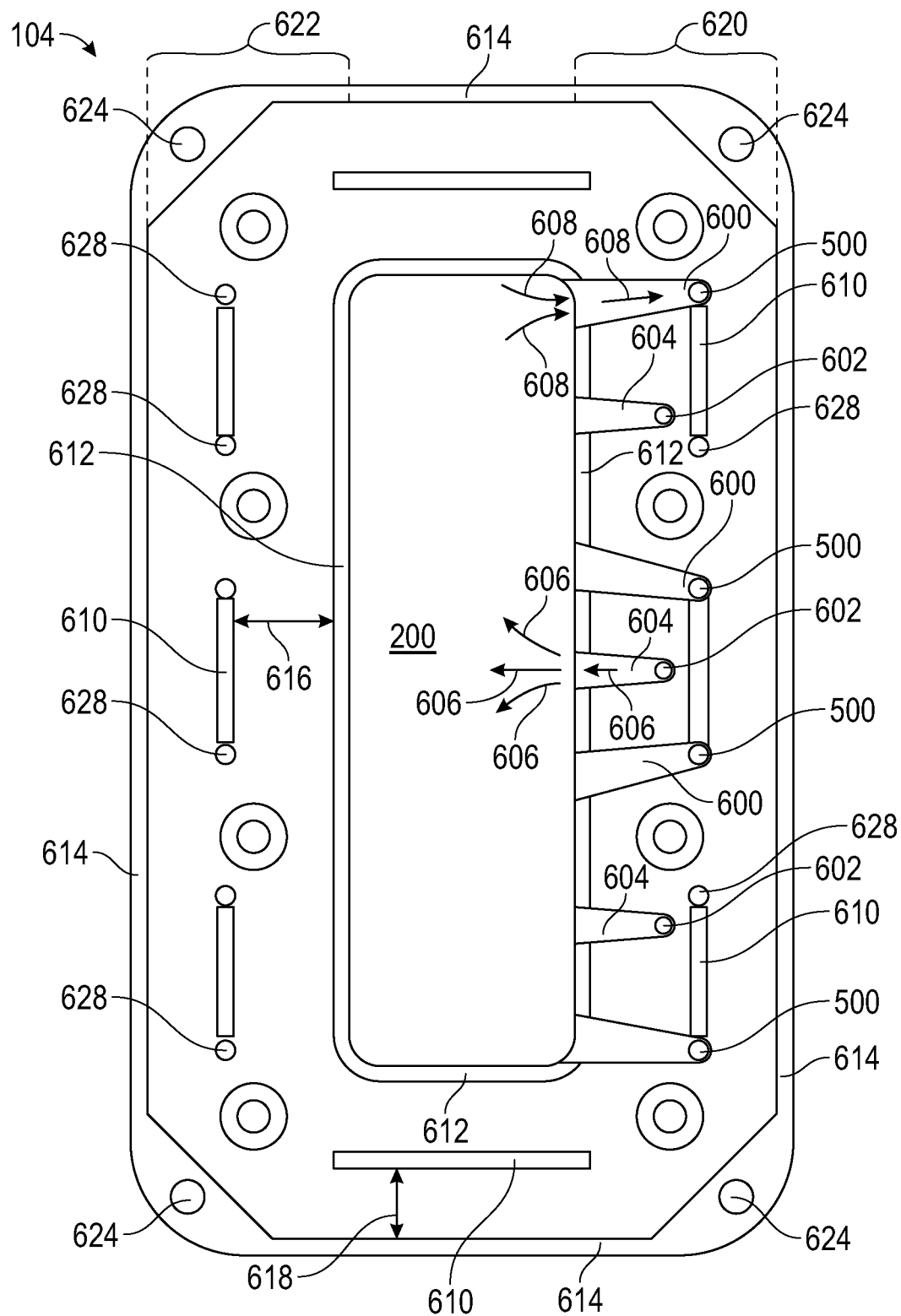
FIGS. 6A and 6B are bottom views of the couplant feeding plate shown with reference to FIGS. 2A and 2C, in accordance with examples of the present disclosure.
Figure 7:
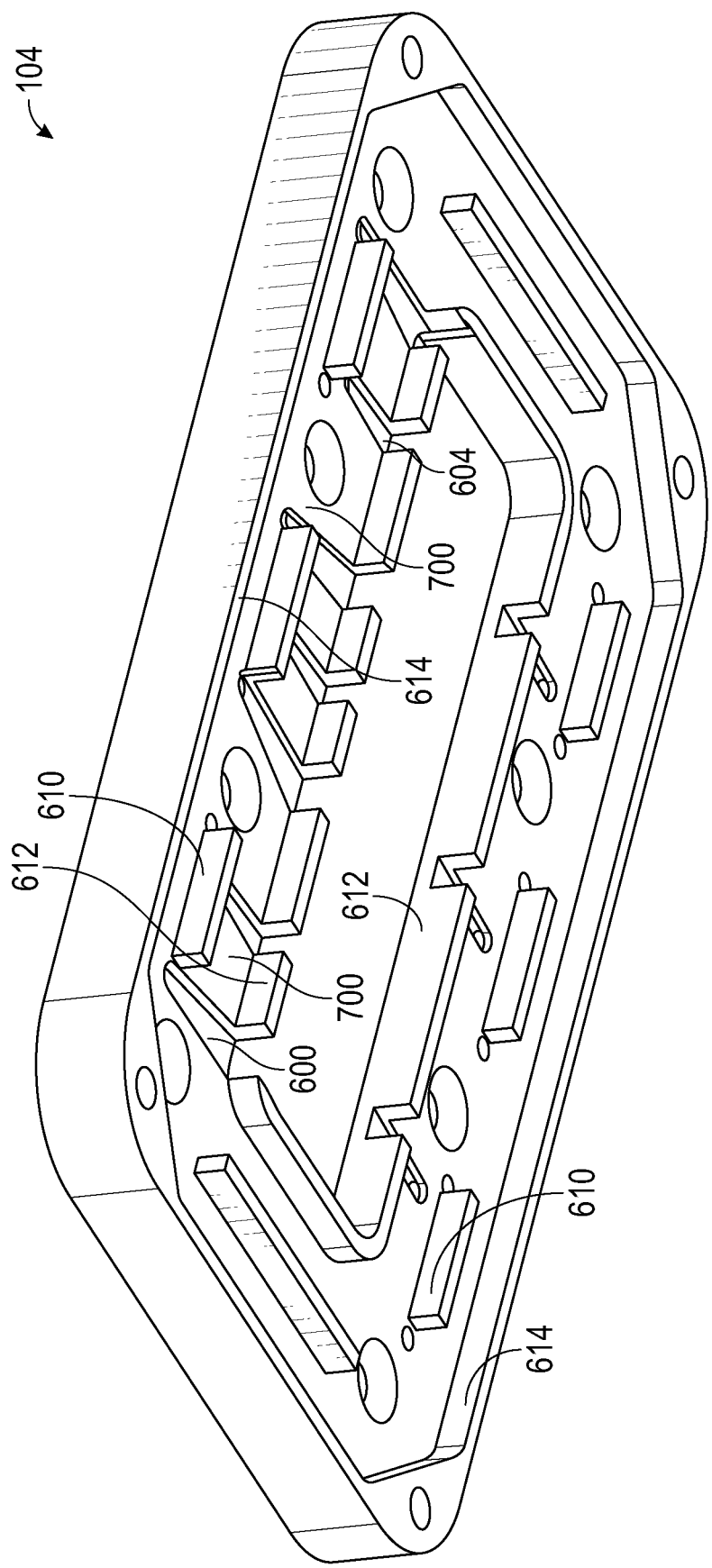
FIG. 7 is a bottom view of the couplant feeding plate shown with reference to FIGS. 2A and 2C, in accordance with examples of the present disclosure.
Figure 8:
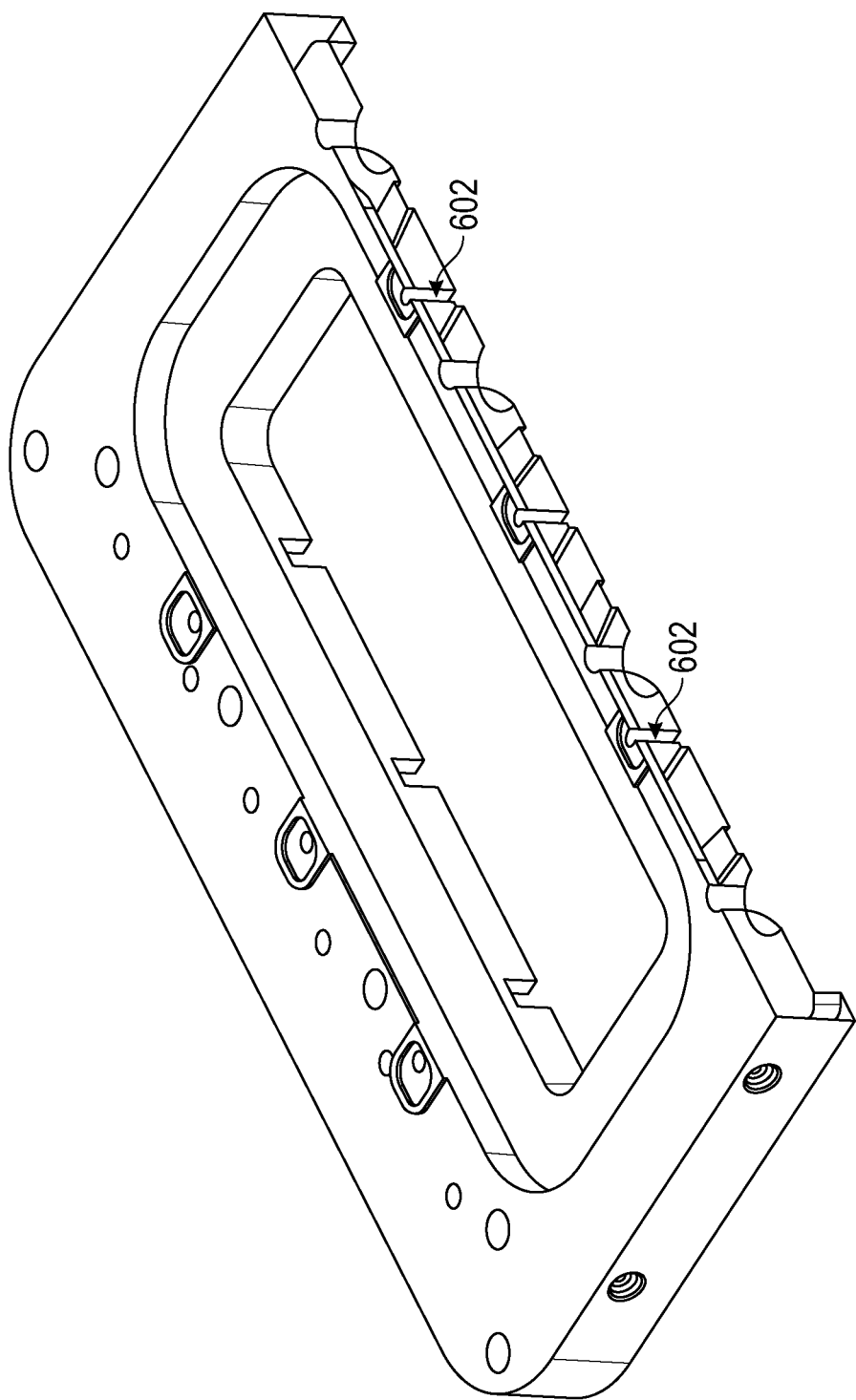
FIG. 8 is a cut-away view of the couplant feeding plate shown with reference to FIGS. 2A and 2C, in accordance with examples of the present disclosure.

In addition, the CFCP 104 can include CFCP couplant ports 602 along with couplant ports 604 as shown with reference to FIGS. 6A and 8. In an implementation, the CFCP couplant ports 602 can be in fluid communication with the couplant inlet 106 and the wedge couplant port 400 such that the CFCP couplant ports 602 can receive couplant from the couplant inlets 106. Therefore, the CFCP couplant ports 602 can allow for the pushing of couplant into the couplant cavity 200. As can be seen with reference to FIG. 6A, the CFCP couplant ports 604 can extend between the CFCP couplant ports 602 and the couplant cavity 200. In an implementation, the CFCP couplant ports 604 can be recessed within CFCP surface 700, as shown with reference to FIG. 7. Thus, in an implementation, the CFCP couplant ports 604 can form a passageway within the CFCP 104 that extends between the couplant cavity 200 and the CFCP couplant ports 602. In an implementation, the CFCP couplant ports 602 and 604 can form a couplant feeding circuit where the CFCP couplant ports 602 and 604 can provide couplant to the couplant cavity 200.

As noted above, the CFCP 104 can function to remove air bubbles from the couplant cavity 200 during inspection of the article 406. In particular, making reference to FIG. 6A, couplant can be pushed or routed into the couplant cavity 200 via the CFCP couplant ports 602 and CFCP couplant ports 604 as shown with directional arrows 606. The couplant within the couplant cavity 200 is used by the probe 402 to determine the existence of any defects of the article 406 during inspection of the article 406, as noted above. Moreover, the couplant can be pulled or routed from the couplant cavity 200 via the CFCP couplant vacuum ports 600, as denoted by directional arrows 608. Specifically, a vacuum source coupled with the CFCP vacuum ports 500 and 600 creates a negative pressure acting through the CFCP vacuum ports 500 and 600, thereby pulling the couplant from the couplant cavity 200. It should be noted that the couplant is present within the couplant cavity 200 long enough for accurate inspection of the article 406. In an implementation, when the couplant is pulled from the couplant cavity 200 via the CFCP vacuum ports 600, any air bubbles within the couplant cavity 200, such as the air bubbles 407, can be pulled from the couplant cavity 200.

Figure 6B:
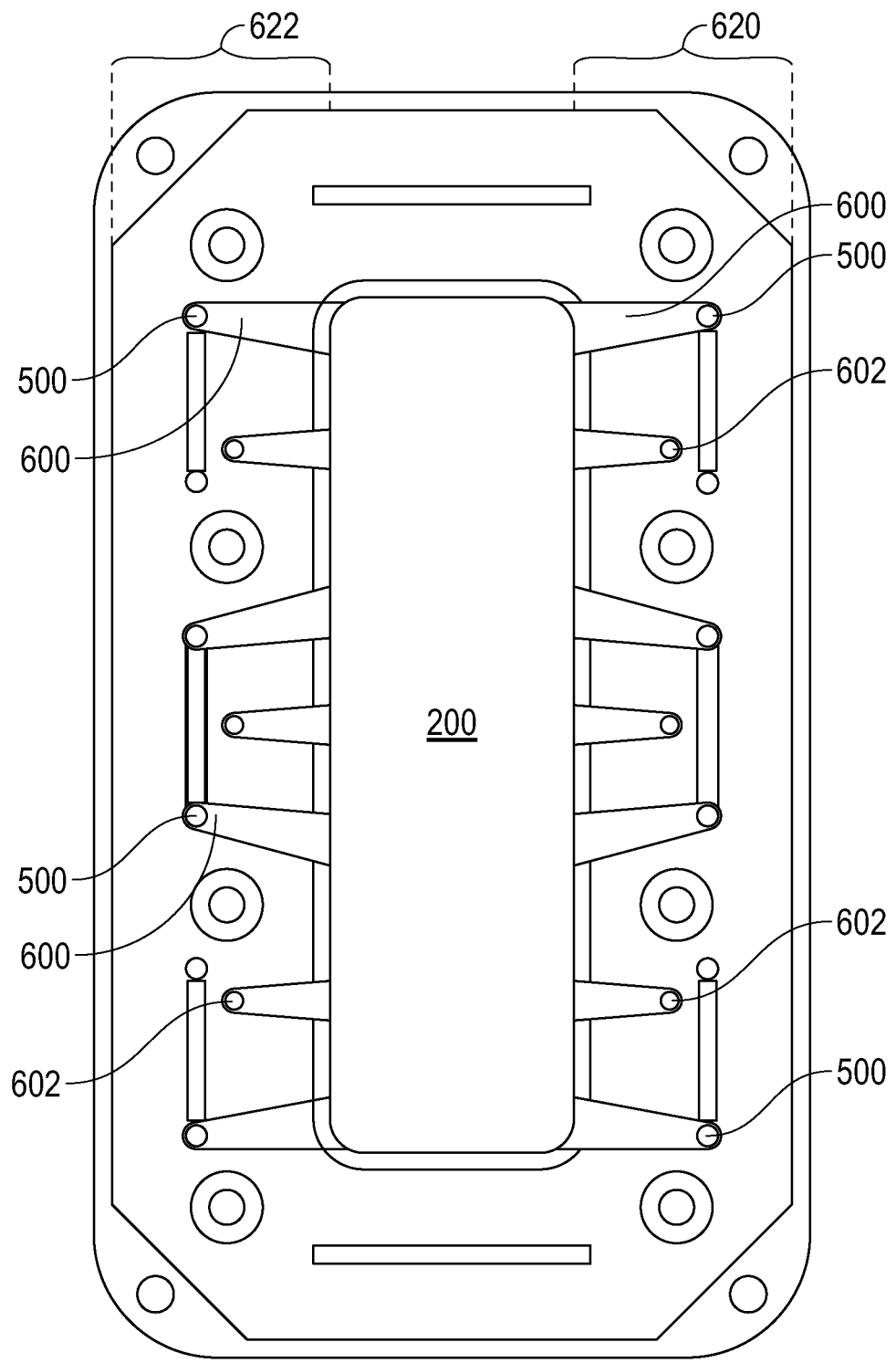

In the implementation shown with regards to FIG. 6A, a side 620 of the CFCP 104 only includes the CFCP vacuum ports 500, the CFCP vacuum ports 600, the CFCP couplant ports 602, and the CFCP couplant ports 604 while a side 622 of the CFCP 104 is free of these features. However, in an implementation, each of the CFCP sides 620 and 622 can include the CFCP vacuum ports 500, the CFCP vacuum ports 600, the CFCP couplant ports 602, and the CFCP couplant ports 604, as shown with respect to FIG. 6B. Moreover, in an implementation, the CFCP vacuum ports 500 and the CFCP vacuum ports 600 can only be located one of the CFCP sides 620 or 622 while the CFCP couplant ports 602 and the CFCP couplant ports 604 can be on both the CFCP side 620 and the CFCP side 622. Alternatively, the CFCP vacuum ports 500 and the CFCP vacuum ports 600 can located at both the CFCP side 620 and the CFCP side 622 while the CFCP couplant ports 602 and the CFCP couplant ports 604 can only be located on one of the CFCP side 620 and the CFCP side 622.

In an implementation, couplant is provided into the couplant cavity 200 via the couplant inlet 106, the wedge couplant port 400, and the CFCP couplant ports 602. Any type of device can be used to provide couplant into the couplant cavity 200 via the couplant inlet 106, the wedge couplant port 400, and the CFCP couplant ports 602. For example, any type of pump that can move fluid through a circuit such as a circuit created by the couplant cavity 200, the couplant inlet 106, the wedge couplant port 400, and the CFCP couplant ports 602 may be used to provide couplant. The CFCP couplant port 604 is in fluid communication with the CFCP couplant port 602 and extends therefrom to the couplant cavity 200. Thus, the couplant provided to the CFCP couplant port 602 is routed into the couplant cavity 200 via the CFCP couplant port 604 as shown with directional arrows 606 in FIG. 6A.

While the couplant is being routed (e.g. pumped) into the couplant cavity 200 and is disposed within the couplant cavity 200, the probe 402 can be used to inspect the article 406 for any defects. Making reference again to FIG. 4, the NDT apparatus 100 can include the couplant chamber 404 that can be filled with a couplant. In an implementation, the couplant chamber 404 can be separated from the couplant cavity 200 via the membrane 202 such that the membrane 202 separates the couplant cavity 200 from the couplant chamber 404. However, as mentioned above, the membrane 202 can have an acoustic impendence similar to a couplant disposed within the couplant cavity 200 and the couplant chamber 404. Therefore, the membrane 202 does not substantially interfere with acoustic transmissions between couplants in each of the couplant cavity 200 and the couplant chamber 404. Similar to the couplant provided to the couplant cavity 200, examples of couplant in the couplant chamber 404 can include water, gel, or oil. In an implementation, the couplant in the couplant cavity 200 and the couplant chamber 404 can be the same. In an implementation, the couplant within the couplant chamber 404 and the couplant cavity 200 can function as a delay between an initial pulse from the probe 402 and a surface signal from the article 406 during ultrasonic scanning. The surface signal can be a reflection of the initial pulse from the article surface 408.

Moreover, as the couplant is being routed into the couplant cavity 200, a vacuum is applied to the wedge vacuum port 300 and the CFCP vacuum port 600. Any type of device may be used to apply vacuum at the wedge vacuum port 300 and the CFCP vacuum port 600. Examples of devices that may be used to create a vacuum at the wedge vacuum port 300 and the CFCP vacuum port 600 include various types of vacuum pumps to create a suction. For example, a vacuum pump or any negative pressure source that can create any type of vacuum or negative pressure with a small flow rate can be used. Any type of vacuum pump or negative pressure source known to those skilled in the art may be used. Further examples may include rotary vane single or dual stage lubricated pumps, such as oil lubricated pumps, or nonlubricated pumps. It should be noted that throughout this document, reference to a vacuum source can also include a negative pressure source. Moreover, any type of vacuum pump that can be modified to accept different flow rates based on a surface and area to be inspected can also be used. The vacuum applied at the wedge vacuum port 300 and the CFCP vacuum port 600 pulls or routes the couplant that is within the couplant cavity 200 into the CFCP vacuum ports 600 along the directional arrows 608 during ultrasonic scanning by the probe 402. In an implementation, as the couplant is pulled from the couplant cavity 200, air bubbles, such as the air bubbles 407, that are present in the couplant cavity 200 are also pulled from the couplant cavity 200 by virtue of the vacuum being applied at the wedge vacuum port 300 and the CFCP vacuum port 600. Thus, the problems discussed above that air bubbles create during inspections of articles are minimized since air bubbles are pulled from the couplant cavity 200. More specifically, air bubbles can be removed such that the air bubbles do not interfere with the surface signals reflected from the article surface 408.

During inspection of the article 406, couplant within the couplant cavity 200 may escape the couplant cavity 200. In order to contain couplant within the couplant cavity 200, the CFCP 104 can include a gasket 412 and a gasket 414, as shown with reference to FIGS. 4 and 9. In an embodiment, each of the gaskets 412 and 414 can be formed from the same material or different materials. For example, each of the gaskets 412 and 414 can be formed of foam and Polytetrafluoroethylene. In addition, each of the gaskets 412 and 414 can be formed from Aqualene™. Regardless of the material used to form the gaskets 412 and 414, the gaskets 412 and 414 can function to contain couplant within the couplant cavity 200 during inspection of the article 406 with the NDT apparatus 100. In some implementations, the gaskets 412 and 414 can compress such that the CFCP 104 can sealingly engage with the article 406 during inspection. Moreover, in some embodiments, the CFCP 104 can include pins 624 (FIG. 6A) that can limit an amount of compression of the gaskets 412 and 414.

Figure 9:
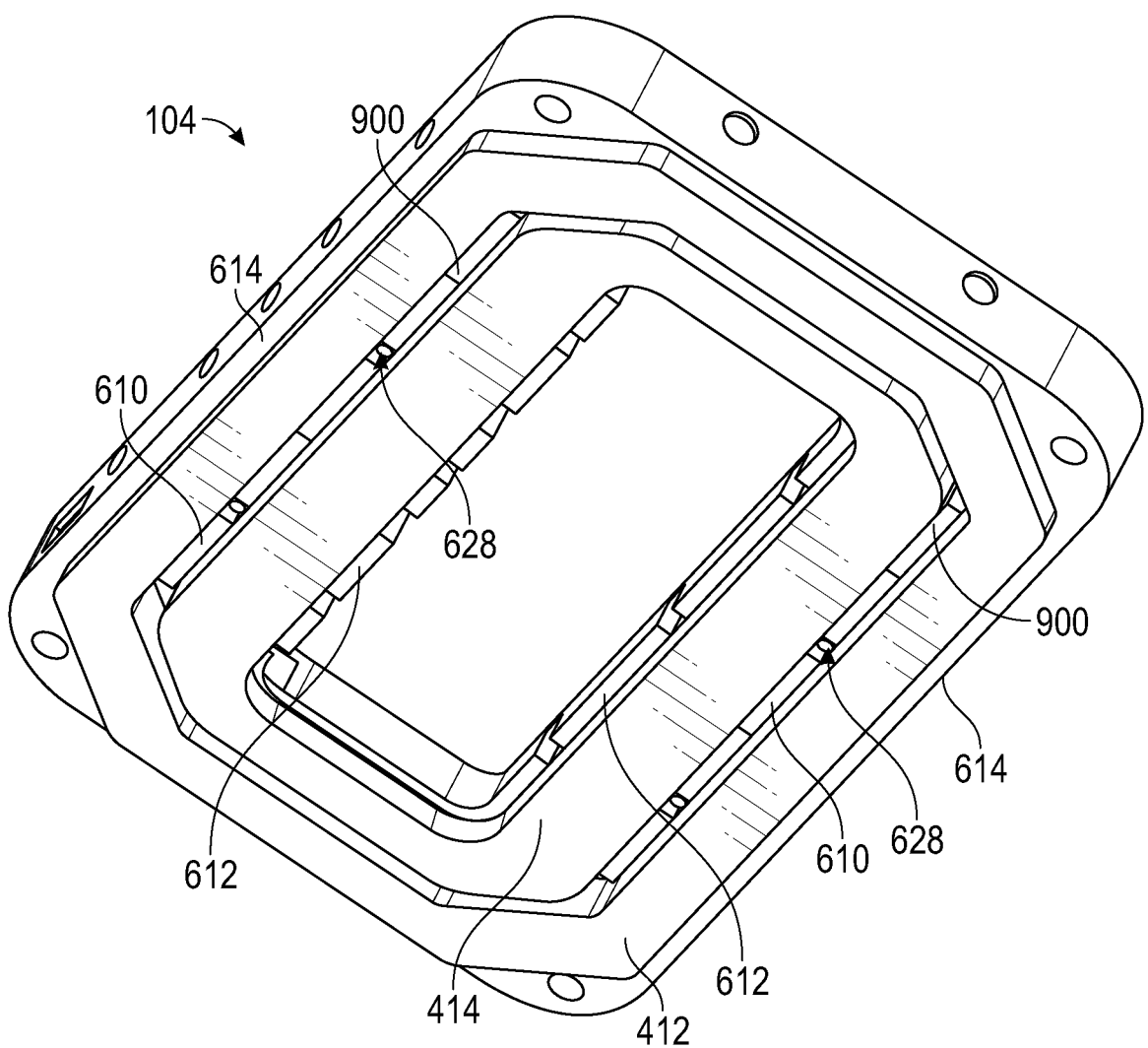
FIG. 9 is a bottom view of the couplant feeding plate shown with reference to FIGS. 2A and 2C, in accordance with examples of the present disclosure.

Making reference to FIGS. 6A, 7, and 9, in an embodiment, the CFCP 104 can include walls 610-614 that can function to hold the gaskets 412 and 414 in the CFCP 104. In an embodiment, the walls 610-614 can extend away from the CFCP surface 700 where the walls 610 and 612 can form a groove 616. In addition, the walls 610 and 614 can form a groove 618. As shown with reference to FIG. 9, the gasket 414 can be disposed within the groove 616 defined by the walls 610 and 612 such that walls 610 and 612 can hold the gasket 414 in the CFCP 104 via the groove 616. Moreover, as shown with reference to FIG. 9, the gasket 412 can be disposed within the groove 618 defined the walls 610 and 614 such that the walls 610 and 614 can hold the gasket 412 in the CFCP 104 via the groove 618.

When the couplant, which can include air bubbles, is pulled from the couplant cavity 200 via the vacuum inlet 108, the CFCP vacuum port 500, and the CFCP vacuum port 600, the pulled couplant can be provided to a filtration device that can extract air bubbles from the couplant prior to feeding the couplant back to the couplant source that provides couplant to the CFCP couplant port 602. Examples of devices that may be used to filter air bubbles from the couplant recovered from the NDT apparatus 100 include any type of filter with an air separator or even a tank configured to allow the air bubbles rise to a surface of fluid within the tank. Moreover, once the air bubbles are separated from the couplant, the device can return the couplant to the couplant source. Thus, a closed loop is formed where the closed loop includes the couplant inlet 106, the wedge couplant port 400, the CFCP couplant ports 602, the CFCP couplant ports 604, the couplant cavity 200, the CFCP vacuum ports 600, and the CFCP vacuum port 500. Moreover, the CFCP 104 can have a closed loop formed from the CFCP 104, the CFCP couplant ports 602, the CFCP couplant ports 604, the couplant cavity 200, the CFCP vacuum ports 600, and the CFCP vacuum ports 500.

During use of the NDT apparatus 100, couplant may escape the couplant cavity 200. In some implementations, in order to limit the amount of couplant that escapes from the NDT apparatus 100 during inspection, such as couplant that is left on a surface of the article 406 after the NDT apparatus 100 passes over the article 406, the gaskets 412 and 414 can be next to each other and can form a couplant suction circuit 900, as shown with reference to FIG. 9. In an implementation, the suction circuit 900 can include suction ports 628, as shown with reference to FIGS. 6A and 9. The suction ports 628 can be in fluid communication with the vacuum source and the device that removes the air bubbles from the couplant and returns the couplant to the couplant source to which the CFCP vacuum ports 500 are coupled. As shown with regards to FIG. 9, the suction circuit 900 is formed between an outer periphery of the gasket 414 and an inner periphery of the gasket 412. During operation of the NDT apparatus 100, couplant that escapes the couplant cavity 200 may be pulled away from the article 406, i.e., sucked up, from the article 406 by the suction ports 628 in the couplant suction circuit 900.

Figure 10:
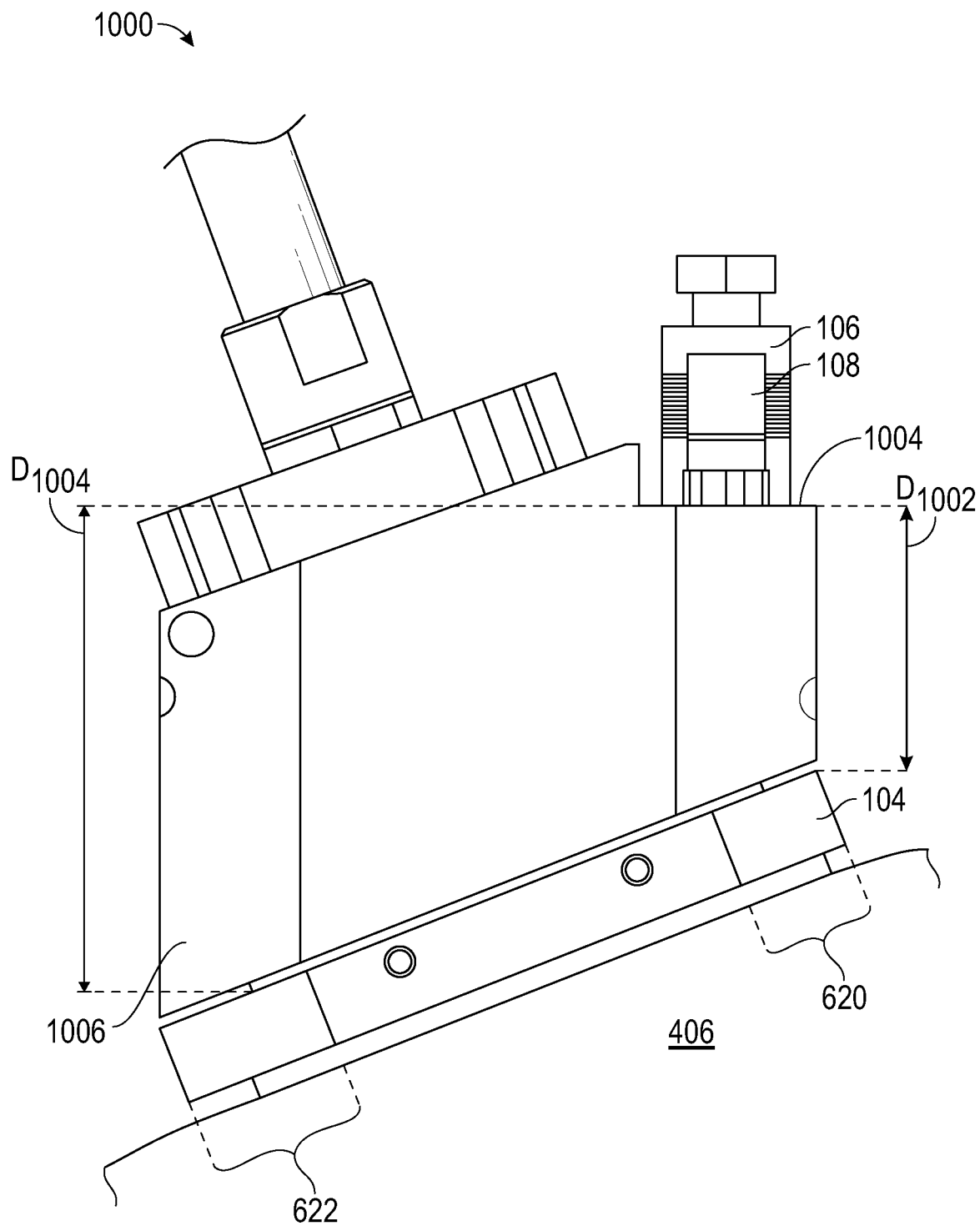
FIG. 10 illustrates an alternative implementation of a NDT apparatus, in accordance with examples of the present disclosure.

In some embodiments, when the CFCP 104 couples to a wedge of a NDT apparatus, a bottom surface of the NDT apparatus may be placed in a position along article 406 such that the CFCP 104 is inclined. To further illustrate, reference is now made to FIG. 10, which illustrates an NDT apparatus 1000 having the CFCP 104, in accordance with an implementation. As noted above with reference to FIG. 6A, in an implementation, the CFCP side 620 can have the CFCP vacuum ports 500, the CFCP vacuum ports 600, such as to capture or suppress any air bubbles that may rise within the couplant cavity due to a buoyant force, with the CFCP inclined as shown. The region 620 can also include the CFCP couplant ports 602, and the CFCP couplant ports 604 while the CFCP side 622 is free of the CFCP vacuum ports 500, the CFCP vacuum ports 600, the CFCP couplant ports 602, and the CFCP couplant ports 604. In an implementation, the NDT apparatus 1000 can have a configuration where the CFCP side 620 is closer to the couplant inlet 106 and the vacuum inlet 108, as shown with reference to FIG. 10. More specifically, the CFCP side 620 can be located a distance $D_{1002}$ from an upper surface 1004 of a wedge 1006 of the NDT apparatus 1000. Moreover, in this implementation, the CFCP side 622 can be a distance $D_{1004}$ away from the wedge upper surface 1004. It should be noted that in an implementation, the NDT apparatus can be used at angle and any focal distance.

Figure 11:
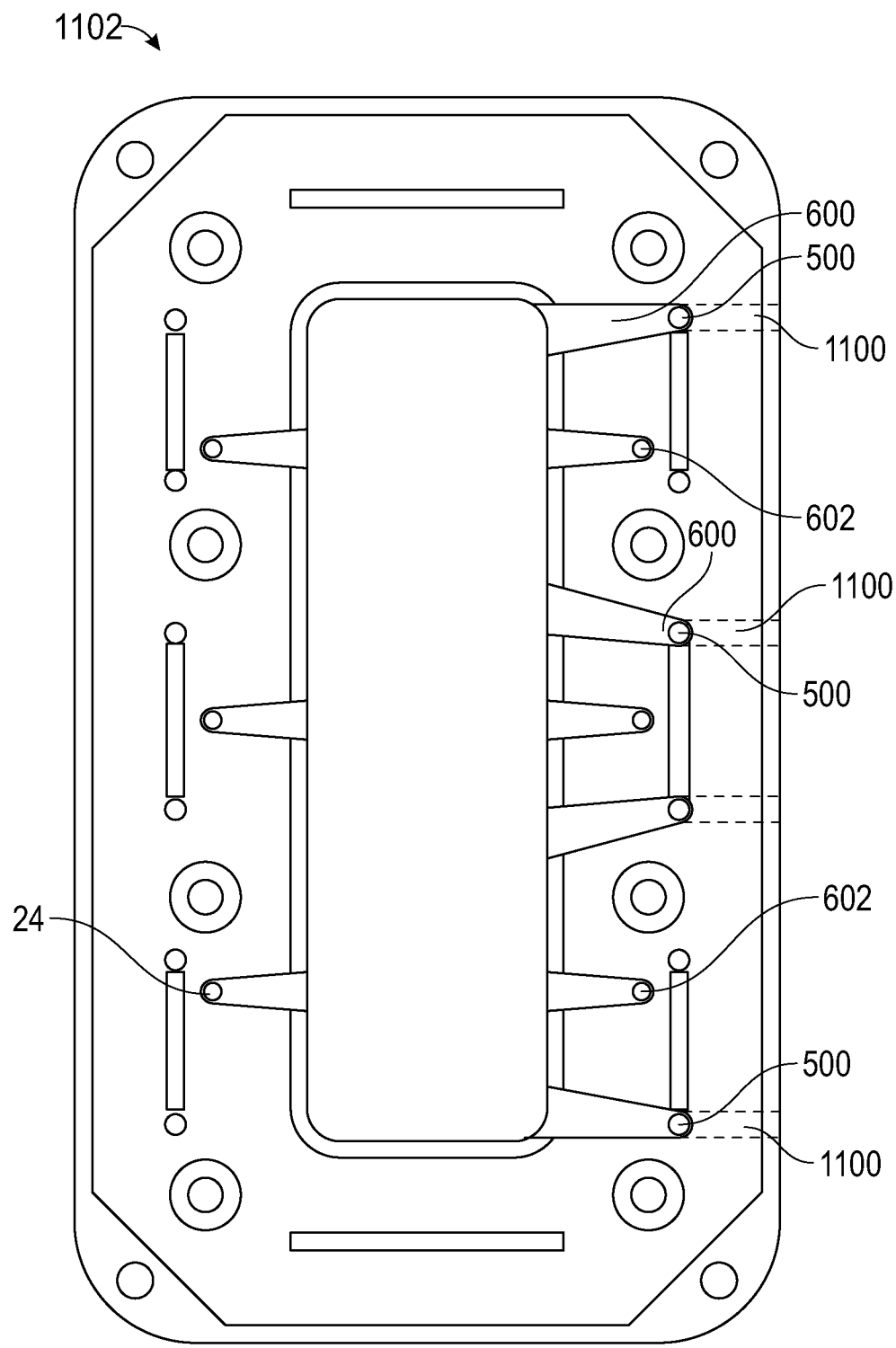
FIGS. 11 and 12 illustrate alternative implementations of a couplant feeding circuit plate, in accordance with examples of the present disclosure.
Figure 12:
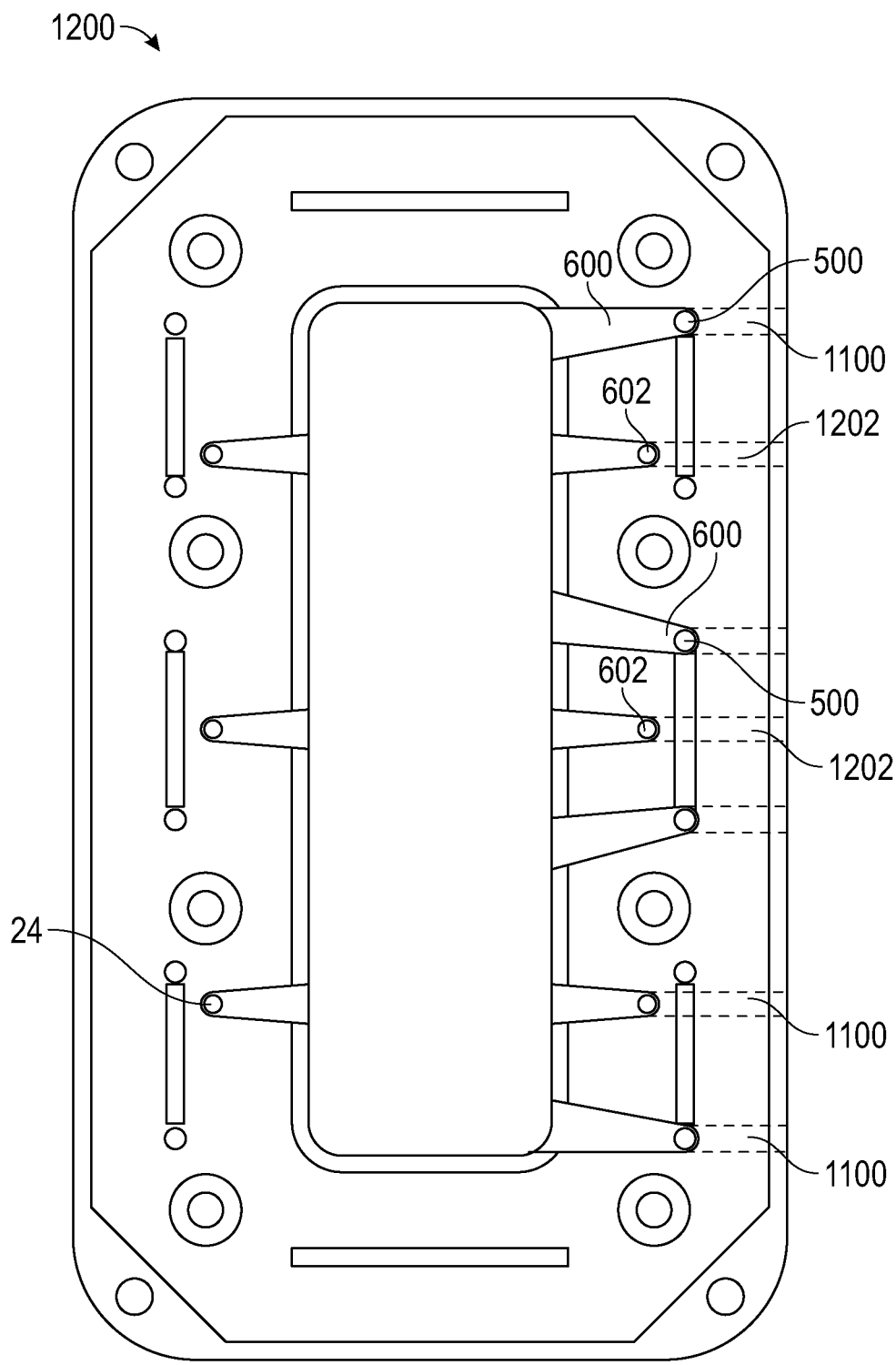

In some of the implementations discussed above, the CFCP 104 is in fluid communication with a couplant source via the wedge 102. In addition, in some of the implementations discussed above, the CFCP 104 is in fluid communication with a vacuum source via the wedge 102. In further implementations, a CFCP having the CFCP vacuum ports 500, the CFCP vacuum ports 600, the CFCP couplant ports 602, and the CFCP couplant ports 604 may directly couple with a couplant source. Moreover, in further implementations, a CFCP having the CFCP vacuum ports 500, the CFCP vacuum ports 600, the CFCP couplant ports 602, and the CFCP couplant ports 604 may directly couple with a vacuum source. Additionally, in further implementations, a CFCP having the CFCP vacuum ports 500, the CFCP vacuum ports 600, the CFCP couplant ports 602, and the CFCP couplant ports 604 may directly couple with both a couplant source and a vacuum source. For example, in some implementations, the CFCP vacuum source ports 1100 may be disposed within a CFCP 1102, as shown with reference to FIG. 11. In particular, the CFCP vacuum source ports 1100 may couple with a vacuum source and a device that removes the air bubbles from the couplant and returns the couplant to the couplant source as discussed above. In this implementation, the CFCP couplant outlets may still couplant source via a wedge, such as the wedges 102 and 1006 described above. In implementations where both sides of a CFCP include vacuum ports and vacuum ports, the CFCP may include CFCP vacuum source ports on both sides of the CFCP.

In further implementations, a CFCP can couple directly with both a couplant source and a vacuum device that removes the air bubbles from the couplant and returns the couplant to the couplant source as discussed above. For example, a CFCP 1200 can include CFCP couplant source ports 1202 that couple directly with a couplant source as discussed above along with the CFCP vacuum source ports 1100. In implementations where both sides of a CFCP include couplant ports, couplant ports, vacuum ports, and vacuum ports, the CFCP may include CFCP couplant source ports and CFCP vacuum source ports on both sides of the CFCP.

Thus, the NDT apparatuses 100 and 1000 according to the present disclosure comprises vacuum ports and couplant ports that can keep almost all of the couplant, such as water, within the NDT apparatus. Moreover, couplant used to fill the couplant chamber 404 can be constant where no couplant will be entering or exiting the probe chamber during use of the NDT apparatus 100 or 1000. Also, during operation of the NDT apparatuses 100 and 1000, couplant that can be used to fill the couplant cavity 200 can be recirculated. Thus, little to no couplant is wasted during use.

As noted above, the NDT apparatuses 100 and 1000 can include the CFCP vacuum ports 500 along with the CFCP vacuum ports 600. Therefore, any air bubbles within the couplant cavity 200 that could potentially cause problems during use of the NDT apparatuses 100 and 1000 can be removed. As described above, the couplant cavity 200 can be surrounded by a water feeding circuit formed by the CFCP couplant ports 604 and CFCP vacuum ports 500 where the CFCP couplant ports 604 supply couplant that is routed into the couplant cavity 200 and the CFCP vacuum ports 500 pull the couplant along with any air bubbles that form during filling of the couplant cavity 200 and placement of the NDT apparatuses on article to be inspected. In addition, a compression thickness of the gaskets 412 and 414 help to prevent air bubble formation. The compression thickness of the gaskets 412 and 414 can be managed with the pins 624 such that the gaskets 412 and 414 can sustain a compression between about 1 mm and about 2 mm. Accordingly, the NDT apparatuses 100 and 1000 can be used to inspect structures that have a curved configuration since the gaskets 412 and 414 can adapt to the height differences imparted by curved surfaces.

Additionally, during inspection, multiple NDT apparatuses 100 or 1000 may be used to inspect a single structure. During operation, the NDT apparatuses 100 or 1000 are placed where the CFCP vacuum ports 500 are at the top of the NDT apparatuses 100 and 1000 such that any air bubbles within the couplant cavity 200 draft upward and can be sucked out.

Upon completion of an inspection of a structure, the NDT apparatuses 100 and 1000 can remove almost all couplant from the couplant cavity 200 by no longer feeding couplant through the CFCP couplant ports 602 while still being connected to a vacuum. Thus, when the NDT apparatus 100 or 1000 is removed from an inspected article, there is very little "wetness" left behind because the couplant cavity 200 has been emptied.

The above detailed description includes references to the accompanying drawings, which form a part of the detailed description. The drawings show, by way of illustration, specific examples in which the invention can be practiced. These examples are also referred to herein as examples. Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms a or an are used, as is common in patent documents, to include one or more than one, independent of any other instances or usages of at least one or one or more. In this document, the term or is used to refer to a nonexclusive or, such that A or B includes A but not B, B but not A, and A and B, unless otherwise indicated. In this document, the terms including and in which are used as the plain-English equivalents of the respective terms comprising and wherein. Also, in the following claims, the terms including and comprising are open-ended, that is, a system, device, article, composition, formulation, or process that includes elements in addition to those listed after such a term in a claim are still deemed to fall within the scope of that claim. Moreover, in the following claims, the terms first, second, and third, etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed is:

1. A couplant feeding circuit plate comprising:
   a housing comprising a wall extending circumferentially around a couplant cavity, the couplant cavity defined by the wall and a membrane;
   a couplant port disposed in the wall, the couplant port fluidly coupled with the couplant cavity and being configured to route couplant to the couplant cavity; and
   a vacuum port disposed in the wall, the vacuum port fluidly coupled with the couplant cavity and being configured to route at least a portion of the couplant from the couplant cavity.

2. The couplant feeding circuit plate of claim 1, wherein the couplant has a first acoustic impedance and the membrane has a second acoustic impedance similar to the first acoustic impedance.

3. The couplant feeding circuit plate of claim 1, wherein the couplant feeding circuit plate has a top surface and the couplant feeding circuit plate is configured to couple with a wedge of a non-destructive testing (NDT) apparatus at the couplant feeding circuit plate top surface.

4. The couplant feeding circuit plate of claim 3, further comprising:
   a first side that is a first distance away from an upper surface of the wedge when the couplant feeding circuit plate is coupled with the wedge, where each of the couplant port and the vacuum port are disposed at the couplant feeding circuit plate first side; and
   a second side that is a second distance away from the wedge upper surface, wherein the first distance is less than the second distance such that the first side is closer to the wedge upper surface than the second side.

5. The couplant feeding circuit plate of claim 1, wherein the vacuum port is configured to couple directly with a negative pressure source.

6. The couplant feeding circuit plate of claim 1, further comprising:
   a first gasket disposed in the wall; and
   a second gasket disposed in the wall, wherein the first gasket and the second gasket enclose the couplant cavity.

7. The couplant feeding circuit plate of claim 6, wherein each of the first gasket and the second gasket are formed of foam and Polytetrafluoroethylene.

8. The couplant feeding circuit plate of claim 1, where the housing wall comprises:
   a first set of walls extending from a surface of the couplant feeding circuit plate; and
   a second set of walls extending from the couplant feeding circuit plate surface, the second set of walls extending between the first set of walls.

9. A non-destructive testing (NDT) apparatus comprising:
   a wedge comprising:
      a couplant chamber;
      a vacuum port; and
      a couplant port;
   a transducer disposed at a first end of the couplant chamber; and
   a couplant feeding circuit plate having a top surface and a bottom surface, the couplant feeding circuit plate top surface being disposed at a second end of the couplant chamber opposite the couplant chamber first end, the couplant feeding circuit plate comprising:
      a housing comprising a wall extending circumferentially around a couplant cavity, the couplant cavity defined by the wall and a membrane;
      a couplant port disposed in the wall, the couplant port fluidly coupled with the couplant cavity and being configured to route couplant to the couplant cavity, the couplant port being coupled with the wedge couplant port; and
      a vacuum port disposed in the wall, the vacuum port fluidly coupled with the couplant cavity and being configured to route at least a portion of the couplant from the couplant cavity, the vacuum port being coupled with the wedge vacuum port.

10. The NDT apparatus of claim 9, wherein the couplant has a first acoustic impedance and the membrane has a second acoustic impedance similar to the first acoustic impedance.

11. The NDT apparatus of claim 9, wherein the wedge vacuum port is configured to couple directly with a negative pressure source.

12. The NDT apparatus of claim 9, wherein the couplant feeding circuit plate further comprises:
   a first gasket disposed in the wall; and a second gasket disposed in the wall, wherein the first gasket and the second gasket enclose the couplant cavity.

13. The NDT apparatus of claim 12, wherein each of the first gasket and the second gasket are formed of foam and Polytetrafluoroethylene.

14. The NDT apparatus of claim 9, the couplant feeding circuit plate further comprising:
a first side that is a first distance away a top surface of the wedge when the couplant feeding circuit plate is coupled with the wedge, where each of the couplant port and the vacuum port are disposed at the couplant feeding circuit plate first side; and
a second side that is a second distance away from the wedge top surface, wherein the first distance is less than the second distance.

15. The NDT apparatus of claim 9, where the housing wall comprises:
a first set of walls extending from a surface of the couplant feeding circuit plate; and
a second set of walls extending from the couplant feeding circuit plate surface, the second set of walls extending between the first set of walls.

16. A couplant feeding circuit plate comprising:
a housing comprising a wall extending circumferentially around a couplant cavity, the couplant cavity defined by the wall and a membrane;
a couplant port disposed the wall, the couplant port fluidly coupled with the couplant cavity and being configured to route couplant to the couplant cavity;
a vacuum port disposed in the wall, the vacuum port fluidly coupled with the couplant cavity and being configured to route at least a portion of the couplant from the couplant cavity;
a first gasket disposed within the wall;
a second gasket disposed within the wall and next to the first gasket; and
a couplant suction circuit disposed between the first gasket and the second gasket.

17. The couplant feeding circuit plate of claim 16, wherein the couplant has a first acoustic impedance and the membrane has a second acoustic impedance similar to the first acoustic impedance.

18. The couplant feeding circuit plate of claim 16, wherein the first gasket and the second gasket enclose the couplant cavity.

19. The couplant feeding circuit plate of claim 16, wherein the couplant feeding circuit plate has a top surface and the couplant feeding circuit plate is configured to couple with a wedge of a non-destructive testing (NDT) apparatus and the couplant feeding circuit plate further comprises:
a first side that is a first distance away from an upper surface of the wedge when the couplant feeding circuit plate is coupled with the wedge, where each of the couplant port and the vacuum port are disposed at the couplant feeding circuit plate first side; and
a second side that is a second distance away from the wedge upper surface, wherein the first distance is less than the second distance such that the first side is closer to the wedge upper surface than the second side.

20. The couplant feeding circuit plate of claim 16, where the housing wall comprises:
a first set of walls extending from a surface of the couplant feeding circuit plate; and
a second set of walls extending from the couplant feeding circuit plate surface, the second set of walls extending between the first set of walls.

* * * * *

UNITED STATES PATENT AND TRADEMARK OFFICE
CERTIFICATE OF CORRECTION

PATENT NO. : 12,292,410 B2  
APPLICATION NO. : 17/916334  
DATED : May 6, 2025  
INVENTOR(S) : Faucher et al.

Page 1 of 1

It is certified that error appears in the above-identified patent and that said Letters Patent is hereby corrected as shown below:

On the Title Page

In Column 2, item (56) under "Other Publications", Line 1, delete "AI" and insert --AL-- therefor Signed and Sealed this  
Nineteenth Day of August, 2025

Coke Morgan Stewart  
*Acting Director of the United States Patent and Trademark Office*